V. N. BEARDSLEY.
Dumping Wagon.
No. 93,041.
Patented July 27, 1869.
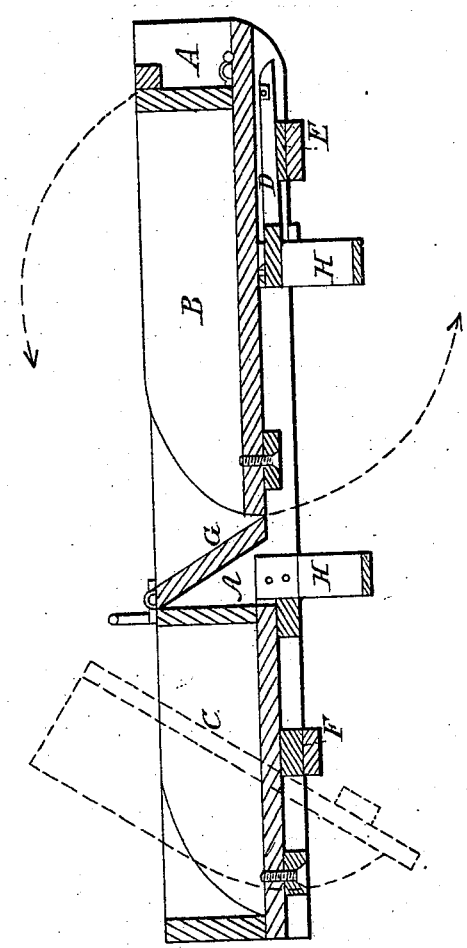

United States Patent Office.

UDNEY N. BEARDSLEY, OF LAWTON, MICHIGAN.

*Letters Patent No. 93,041, dated July 27, 1869.*

IMPROVEMENT IN DUMPING-WAGONS.

The Schedule referred to in these Letters Patent and making part of the same.

*To all whom it may concern:*

Be it known that I, UDNEY N. BEARDSLEY, of Lawton, in the county of Van Buren, and in the State of Michigan, have invented certain new and useful Improvements in Dumping-Wagons; and do hereby declare that the following is a full, clear, and exact description thereof, reference being had to the accompanying drawings, and to the letters of reference marked thereon.

The nature of my invention consists in constructing a wagon-bed in such a manner that the load can be dumped in the same manner as from a cart, so as to save the time and labor that are usually expended in the ordinary method.

The accompanying drawing represents a section view of my invention.

Letter A represents an ordinary wagon-bed, which has been divided into two sections.

Inside of this bed there are two boxes, B and C, about equal size, pivoted in such a manner that they can be tilted up, as shown by the red lines, so as to dump their contents.

The front box B is pivoted to a pair of hounds, D, the front ends of which are bolted to the inside of the box A, and rests upon the front bolster E, at such a distance from where the box is pivoted, so as to allow it to clear the front hounds in dumping.

The rear box C is pivoted to the cross-piece F, directly over the rear axle, so that the load can be dumped out behind the wagon.

In the rear of the front box B, there is placed the fixed, slanting board G, which serves to keep the load in the box, and when the box is tilted up, all that portion in the rear will at once slide out.

The load will be sufficient of itself to balance these boxes, but, in order to make them secure, they have been provided with clasps, so as to hold them down.

Extending downward from the bottom of the bed A, there are two stirrups, H, by means of which the bed is secured to the wagon-frame.

The front one extends far enough down to receive a short reach from the front axle, while the other receives the hounds from the hind axle.

This short reach from before, and the hounds from behind, are secured to the stirrups by means of bolts, thus dispensing with a continuous reach.

Attached to the front end of the box C, there is an iron loop, I, so as to enable the driver to dump the load more easily.

Having thus described my invention,

What I claim as new, and desire to secure by Letters Patent, is—

1. The arrangement of the frame A, boxes B C, board G, and stirrups H H, all constructed and operating substantially as set forth.

2. The stirrups H, when used to secure the bed to the wagon, and to dispense with the continuous reach, substantially as described.

In testimony that I claim the foregoing, I have hereunto set my hand, this 19th day of April, 1869.

UDNEY N. BEARDSLEY.

Witnesses:
I. A. BEARDSLEY,
B. M. STREETER.